April 5, 1966  N. S. VALENTINE ETAL  3,244,454
APPARATUS FOR CONVEYING ARTICLES IN LAUNDRIES, DRY-CLEANING
ESTABLISHMENTS AND THE LIKE
Filed April 6, 1964  6 Sheets-Sheet 1

Fig. 1.

Inventors
Norman S. Valentine
Maurice C. Lemon
By
Watson, Cole, Grindle & Watson
Attorneys

United States Patent Office 3,244,454
Patented Apr. 5, 1966

3,244,454
APPARATUS FOR CONVEYING ARTICLES IN LAUNDRIES, DRY-CLEANING ESTABLISHMENTS AND THE LIKE
Norman Stanley Valentine, Lancing, and Maurice Charles Lemon, Reigate Heath, England, assignors to Polymark Limited, London, England
Filed Apr. 6, 1964, Ser. No. 357,659
Claims priority, application Great Britain, Apr. 9, 1963, 14,093/63
15 Claims. (Cl. 302—28)

The present invention relates to apparatus for conveying articles in containers and is adaptable for use in laundries, dry-cleaning establishments and the like. The invention is particularly directed to the conveyance of articles in such establishments after they have been classified according to the treatments to which the various articles should be subjected.

In accordance with the present invention apparatus for manipulating containers comprises a container adapted to travel on and to be suspended from a support rail system, said container embodying two rotatable support rollers carried by a member freely movable about a vertical axis so that the roller can move about said axis while guiding the container in a path determined by the characteristics of the support rail system.

Such apparatus may include means for filling the containers, and wherein at least one filling station is provided and containers are supported on a rail at said filling station, or at each filling station during the filling of the container, and the filled container is transferred to a further support rail for conveyance of all containers from one point to another.

Each container may comprise a rigid upper framework incorporating support means for the rollers providing for movement about an axis perpendicular to the rails and an openwork structure suspended from said framework and closed at the bottom by a detachable tie or like fastening.

After filling, the containers are conveyed to points adjacent to and preferably lying over further treatment machines, for example washing machines, and can accordingly be delivered directly into such machines without further handling of the articles being necessary. By these means a very large measure of mechanisation in laundries and like establishments can be obtained.

One construction of apparatus according to the present invention comprises a classifying and conveying device for successive articles, wherein the articles are conveyed from a receiving point to a selected delivery point where the articles are delivered into containers suspended from a rail system. Such containers are preferably of openwork structure to ensure that the articles delivered by air flow action are reliably delivered into the containers without disturbing air currents interfering with the collection of successive articles in the containers. Other forms of container may, however, be adopted, an important feature being, however, that the containers are open at the top to receive the articles and are adapted to be closed or opened at the bottom as required to permit the downward passage of the articles when required.

Each container may comprise a rigid top frame from which the main part of the container is suspended, said rigid frame comprising upstanding supports carrying guide rollers which may if desired be of diabolo shape, that is to say having the minimum diameter at the middle. The rollers and their supports are so placed that they lie in a vertical plane containing the centre of gravity of a filled container and the rollers are preferably supported from overhung stub shafts so that the containers may be readily placed on fixed support rails or attached to travelling conveyor belts, chains or cables. These support rails, belts or the like are disposed overhead and run a suitable path so that filled containers may be dispatched to washing machines or other treatment machines according to the nature of the operations to performed on the articles.

In one convenient arrangement the containers are suitably held at the filling position on short rail sections where they remain until the containers are filled. When the containers are filled they travel towards and are then transferred on to a common transversely directed support rail adapted to receive the containers from all the discharge points from the classifying conveyor, and if the classifying conveyor had discharge points on both sides of a delivery duct, a transversely placed rail may be provided on each side, these transversely disposed guides running convergently so that conveyors received from both guides may be combined on one of them and then carried onward for further treatment, for example by gravity or by means of a travelling chain or cable.

Figure 1:
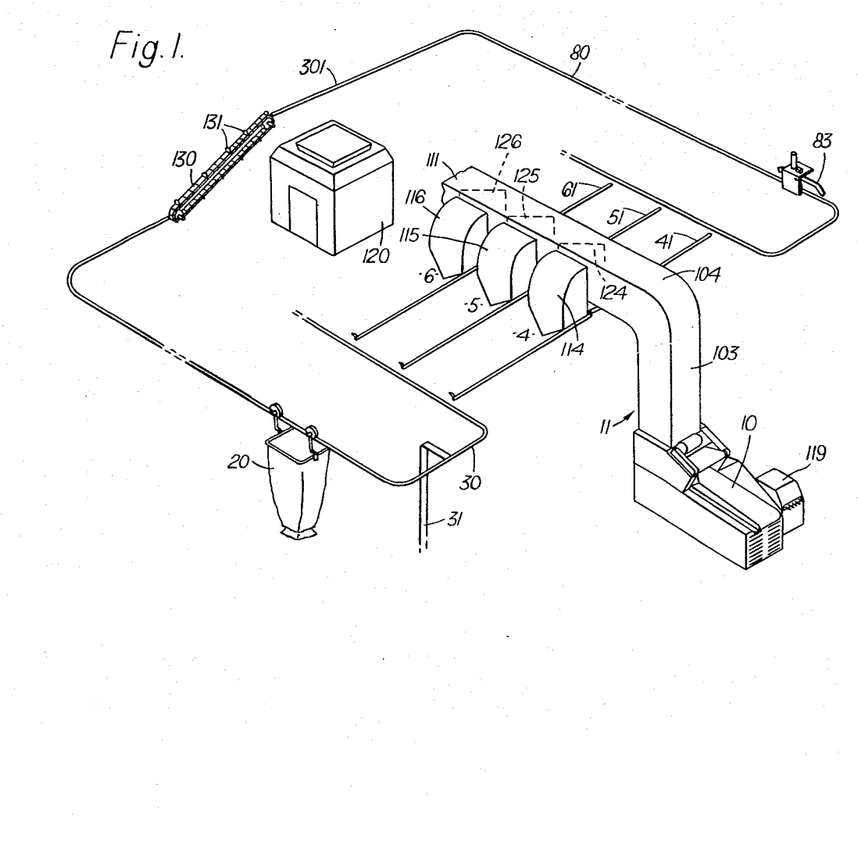
FIG. 1 is a general view illustrating the main features of the invention for conveyance of articles in laundries and like establishments.

The features of the present invention are illustrated in somewhat diagrammatic form on the accompanying drawings in which:

FIG. 1 illustrates a typical form of equipment incorporating the present invention as applied by way of example to the mechanical handling of articles in laundries and like establishments.

In general in the following description the reference numerals are selected on the following plan:

Reference numerals with an initial digit 1 relate to the equipment for handling articles to be supplied for filling the containers.

Reference numerals with an initial digit 2 relate to the containers.

Reference numerals with an initial digit 3 relate to the conveyance system for filled containers.

Reference numerals with initial digits 4 to 7 relate to the four filling stations, shown by way of example.

Reference numerals with an initial digit 8 relate to the rail system for empty containers.

As shown in FIG. 1 a pneumatic conveyor and distributor device, indicated generally at 11 is arranged to receive articles supplied one by one by an operator to a conveyor belt 10 which admits said articles into a vertical air current in a vertically extending duct 103, which distributes such articles through a horizontal duct section 104 and distributes them to a plurality of outlets 114, 115, 116, three only of which are shown on FIG. 1.

Containers 20 are provided for conveying articles from one point to another, loaded containers which have received articles from the outlets 114, 115, 116 being transferred on to an overhead conveyor rail 30 preferably arranged with a slight fall so that such containers are adapted to move by gravity towards a position where such articles are to be discharged from the container. As typical of such a layout, FIG. 1 illustrates the case where the filled containers travel on the rail 30, which is supported by suitable posts 31 towards a washing machine, for example indicated at 120, into which the contents of the containers 20 are to be delivered.

In general, the containers 20 will be filled at a level not greatly above floor level, and accordingly they may have to be raised at one or more points in their travel by suitable lifter means, one example of which is illustrated at 130 on FIG. 1. Such lifter means comprises a belt conveyor having a series of upstanding projections 131 adapted to engage support wheels 25 for the containers 20, and thus to lift such containers to a higher level, where, for example in the case specifically illustrated in FIG. 1 of the drawings, containers are brought to a position immediately above the washing machine 120, into which the contents of the containers can be discharged from the bottom. Empty containers then return towards the filling positions on a return rail 80 ready to be refilled at the filling stations, three of which are shown as 4, 5, 6.

The arrangement of the containers will first be described. Each container consists of a mesh or openwork body part preferably of flexible material, such as nylon string and suspended at the upper end from a rectangular frame 21. Each container is preferably of tubular form and is closed at the bottom by being gathered and tied with cord or string, or by any other suitable form of detachable or releasable fastener.

Figures 2, 3:
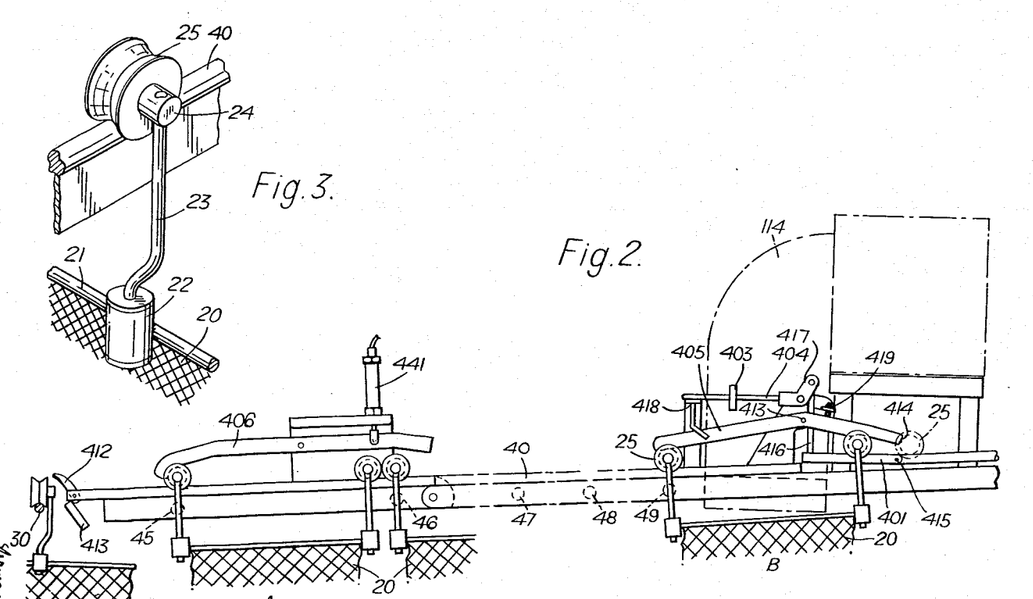
FIG. 2 is a general view illustrating the loading equipment.
FIG. 3 illustrates the arrangement of the support rollers for the containers.

Located approximately centrally of two opposite sides of the frame is a bearing sleeve 22 adapted to house the lower end of a vertical rod 23 in such manner that the rod can rotate about a vertical axis. The rod 23 is cranked outwardly, as illustrated in FIG. 3, and is connected at its upper end to a spindle 24 supporting a deeply grooved roller 25 having tapered sides and preferably of diabolo shape; these rollers 25 are adapted to run on the various rails provided for the containers. These rails may consist of round rod or tube or of metal strip or of one limb of an angle member.

By mounting the diabolo-shaped rollers 25 on a vertical member 23 which is journalled in the sleeve 22, it will be seen that the base of the groove in the roller 25 may lie substantially above the axis of rotation of the vertical rod 23 so that the roller 25 can rotate about its own axis and may turn freely about a vertical axis.

This arrangement is important because it enables each roller 25 to turn independently about the said vertical axis as the container traverses a bend or curve in the rail 30 or 80, or at switch rails hereinafter referred to. During the filling the container is supported from inclined rail sections 40, 50, 60 so on respective to each of the various filling stations.

However, conveyance of the containers 20 from point to point in the plant is effected by means of the common rail 30 or 80 as the case may be, and provisions is made as described hereinafter to enable suspended containers to transfer from points where they are supported on rails at the filling station, on to the common rail 30 for conveyance around the plant, or from the rail 80 on to the rail sections 40, 50, 60 and so on.

FIG. 2 illustrates the arrangement at the filling station where the containers are suspended from rail sections 40, 50, 60 at the filling stations 4, 5, 6, and are stopped in the filling position beneath the outlets 114, 115, 116 by means of a weighing rail 401. Articles are delivered through the pneumatic feed system from the conveyor belt 10 and pass upwardly towards the outlets 114, 115 or 116 and drop into the appropriate container. On attaining a predetermined weight the weighing rail 401 is depressed and the containers move onwardly on the rails 40, 50, 60 to positions where they are stopped by a catch bar 406 controlled by a solenoid or air cylinder 441 ready for delivery on to the common feeder rail 30.

The rails 40, 50 60 are slightly inclined to the horizontal so that the containers move by gravity to a stop position with one roller resting on the weighing rail 401. The accumulating weight in the container causes the trailing roller 25 to exert a downward thrust on the rail 401. This rail is pivoted to the rail 40 and forms an intermediate length and is connected by a link 402 to a lever 404 carrying an adjustable counterweight 403 to vary the value of the weight at which the container is released by depressing the rail 401. Depression of the rail 401 lifts the counterweight 403. A centrally pivoted rocker 405 has a downturned forward part which stops the front roller 25 of the container being filled, this part of the rocker being presesd down by the lifting action of the trailing roller at the other end of the rocker. However, when the rail 401 is depressed the said other end of the rocker is allowed to fall so that the forward part is lifted to release the container after filling.

Filled containers are stored and are released by a catch bar 406 under the operator's control and in the manner described hereinafter with reference to FIG. 6 for delivery on to the conveyance rail 30 for moving the containers from one point to another in the plant. At the end of each rail 40, 50, 60 and so on there is provided adjacent the rail 30 a short pivotally mounted switch rail section 412 balanced by a counterweight 413 which tends to lift the rail section 412 to a normally upwardly extending position as shown on FIG. 2, which is curved in plan, as shown, so that as each roller 25 meets this curved section it is caused to make a turn about the vertical axis sufficient to enable the rollers to jump on to the rail 30, and to complete their own rotation in each case through 90°.

The filled containers move on the rail 30 by gravity, being carried to a higher level by means of lifting devices, such as that illustrated at 130, placed wherever necessary to enable the conveyance rail 30 to be installed on a sufficient incline to ensure satisfactory conveyance of the containers from one point to another, and, of course, diverter rail switches or the like may be provided to enable the containers to be diverted into different paths as required.

The lifting means shown at 130 of FIG. 1 of the drawings is intended by way of example to lift the articles on to a higher level rail section 301 lying above a machine 120 intended to receive the contents of the containers 20, and which may be, for example, a washing machine. Containers brought to rest on the high level rail section 301 by a suitable stop may be emptied in any convenient manner, for example by untying a gathering of the containers at the bottom to allow the articles in the containers to discharge by gravity.

Figure 6:
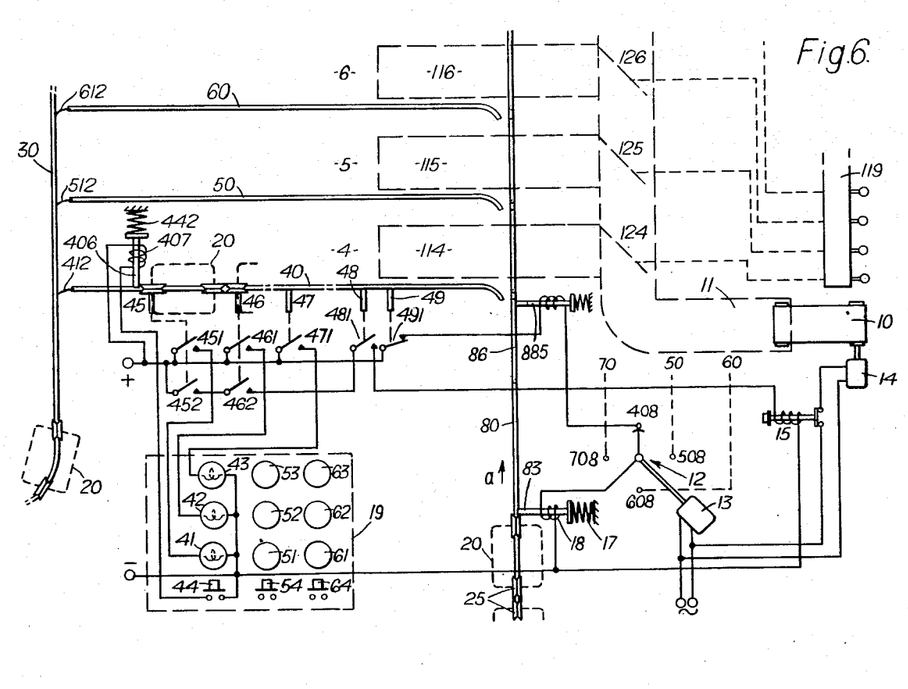
FIG. 6 is a circuit diagram illustrating the control for the feed of empty containers and filled containers according to the invention.

The high level rail 301 then becomes the rail 80 for returning empty containers towards the loading stations, and the empty containers travel by gravity or otherwise on the rail 80 to a point lying immediately in advance of the sets of parallel rails 40, 50, 60 at the several loading stations, the empty containers being held back by stop mechanism 83, as shown in detail on FIG. 6, and comprising a rocking lever adapted to act in the manner of an escapement to allow empty containers to pass onwards for transfer to the rails 40, 50, 60 so that an empty container is directed towards any vacant filling station B, and the filled container is retained by the catch bar 406 shown on FIG. 2 of the drawings, and operated by an air cylinder device 441.

Figure 5:
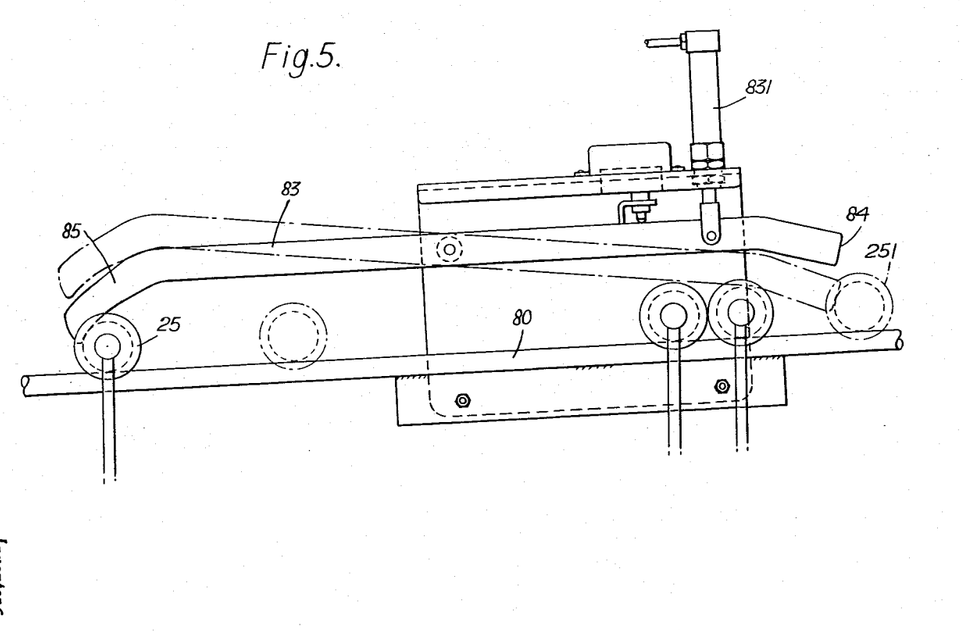
FIG. 5 illustrates control means for regulating the flow of empty containers towards the filling stations.

The escapement lever 83 shown at FIG. 5 comprises a bent portion 84, 85 at each end, the bent part 85 being adapted to engage the leading roller 25 of the foremost container held in the waiting position, when the lever 83 is in the full line position shown on FIG. 6.

When it is desired to release an empty container to enable it to travel towards a selected one of the filling stations, the lever 83 is tilted to the position shown in chain dot lines, by means of an air cylinder device shown in part at 831, whereupon the two rollers 25 of the foremost container are allowed to move onwardly while the back roller 251 of the next following container 20 is stopped by the end face 84 of the lever 83. As soon as the lever 83 returns to its full line position the said following container moves onwardly until it is stopped by the other end bent part 85 of the lever 83, thus maintaining the next container in the ready position.

The containers leaving the escapement lever 83 are selectively directed on to one of the rails 40, 50, 60 by means of pivoted switch rails 86. An air cylinder device 881 is provided for each switch rail 86, the several switch rails shown enabling containers to be directed selectively to any of the rails 40, 50, 60 and so on.

Suitable means are provided and are described hereinafter with reference to FIG. 6 for supplying empty containers to any filling station which has been vacated by a filling container moving onwardly to the catch bar 406, or into abutment with other filled containers retained by such catch bar 406.

Empty containers 20, indicated in dotted lines in plan, and each suspended from a pair of diabolo-shaped rollers 25, return by gravity on the rail 80 towards the filling stations 4, 5, 6 and 7 and a reserve of empty containers is formed by the escapement lever 83. In FIG. 6 such escapement lever is represented by a magnet armature moved to the operative position by a spring 17 and adapted to be released by an electromagnet 18.

An empty container 20 released in this way travels onward in the direction of the arrow a towards the ends of guide rails 40, 50, 60, 70 associated with the filling stations 4, 5, 6 and 7 where the containers 20 are adapted to be filled. A container 20 moving on the rail 80 is guided into a selected filling station 4, 5, 6, 7 by selective operation of the switch rails 86 in the manner already described.

FIG. 6 shows the details of the switching mechanism associated with the filling station 4, and it will be understood that similar equipment is provided for each of the stations 5, 6 and 7 also.

After each container has been filled, such container is released while supported by the rails 40, 50, 60, 70 and moves to the point A where it is held from further movement by means of the catch bar 406, in the case of the unit 4 shown in detail, this means being shown as a plunger subjected to the action of a spring 442 to press it into the operative position and being adapted to be released by an electromagnet coil 407.

When it is desired to release a loaded container from the rail 40 for delivery to the rail 30, the magnet 407 is operated to allow one filled container to run over the switch rail 33 on to the support rail 30.

In the embodiment shown, each filling station 4, 5, 6 and 7 is adapted to support three filled containers 20 lying one behind the other, only one of which is indicated in the case of the filling station 4. This filled container is adapted to operate a switch device 45 in turn operating contacts 451, 452. A second filled container, resting against the already filled container 20, is adapted to operate a switch device 46 to close the contacts 461 and 462, and a third filled container, resting against the two already filled containers, is adapted to operate a switch device 47 which in turn operates a switch contact 471. An additional switch device 48 operates a switch contact 481, as each container moves by gravity away from the filling position to the three storage positions represented by the switch devices 45, 46 and 47. A further switch device 49 is operated to open a switch contact 491 when a container is in the filling position to receive articles from the belt 10, through the conveyance system 11 and the delivery member 114.

A control panel, indicated generally at 19, is provided, having a number of vertical rows of supervisory and control means, each vertical row pertaining to one of the stations 4, 5, 6 or 7 and so on. Each signalling position may comprise three indicator lamps 41, 42, 43; 51, 52, 53 and so on, as well as a control switch button 44, 54, 64, the purpose of which will be explained later. Similar equipment to that shown at station 4 is, of course, provided at the other filling stations.

The three indicator lamps, for example 41, 42, 43 in the case of the filling station 4, are intended to indicate which of the three storage positions are occupied and the switch button 44 is adapted to control the release of the catch bar 406 by operating the respective electromagnet 407, to allow the first loaded container 20 to be directed into the conveyance rail 30 for transmission to some other part of the plant; each other control unit 51 to 54, 61 to 64, and 71 to 74 performs the same function in respect to the other filling stations 5 to 7 respectively.

The switch devices 45 to 49 are assumed to be in the positions where no containers are present at the station 4. If now a container has already been filled and has moved to the position where it operates the switching device 45, the contact 451 will be closed illuminating the signal lamp 41. Likewise, if a second filled container has operated the switch device 46, the switch contact 461 will be closed and the signal lamp 42 will be illuminated; when the third container reaches the switch device 47 the contact 471 causes the indicator lamp 43 to light.

When each container has been filled and moves towards the switch device 47, it passes the switch device 48 and momentarily closes the contact 481. If first and second filled containers are already in position and have closed the second contacts 452 and 462 of the switch devices 45 and 46 the contact 481, which is in series with the aforesaid contacts, provides a circuit to an electromagnet 15 which trips a control switch for a motor 14 driving the conveyor belt 10 and stops the motor, thus providing a positive reminder to the operator that at least one of the units 4, 5, 6 or 7 carries a full load of filled containers, and care should be taken not to transmit further articles to that section of the apparatus.

Figure 4:
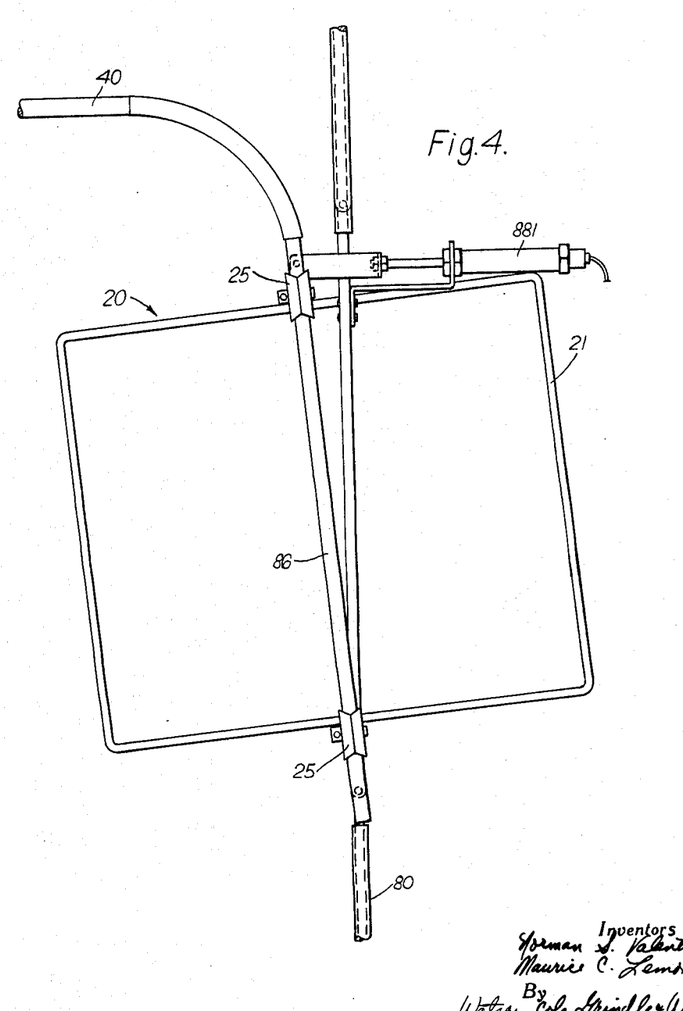
FIG. 4 is a plan view showing the means for selective transfer of empty containers from a support rail towards the loading positions.

The movable switch rails 86 have already been described with reference to FIG. 4; they are adapted to be displaced by means of an air cylinder 881, or, as shown in FIG. 6, by the action of an electromagnet 886, connected in series with the switch contact 491.

All the magnet coils 886 (of the various filling stations) are connected to the fixed contacts of a rotary switch device 12 having a rotary contact constantly driven by a motor 13, this contact being connected to the magnet 18 operating the plunger 83 retaining empty containers 20 on the rail section 80.

The general construction and operation of this control system will be explained hereinafter and will serve to show the operation of the container feed device.

The supervisory panel 19 is placed adjacent to the operator who feeds articles on to the belt 10, for the purpose of delivering said articles to the various filling stations 4, 5, 6 and 7 where containers 20 are filled with such articles.

This operator or another operator has a keyboard 119 by which she can deliver articles selectively to any of the stations 4 to 7 (and others as necessary) by controlling the flap members 124, 125, 126 and so on.

The operator feeds articles one at a time on to the belt 10 and suitably operates her keyboard 119 so as to deliver articles as required to the different stations 4 to 7 by operating the flap members 124, 125, 126 and so on. Suppose a first article is being delivered to the station 4 by movement of the flap member 124, it will be understood that the operator actuates the respective key of the keyboard so that the article passing through the conveyance line 11, is delivered to an outlet over the container which is being filled. This container operates the switch device 49 in this position and opens the switch contact 491. In consequence of this action when the rotary contact of the switch 12 touches the respective fixed contact 408, neither the magnet 407 nor the magnet 18 is operated and no empty container is allowed to travel along the rail 80 towards the stations 4, 5, 6 and 7. The plunger 885 maintains the respective displaceable switch rail 86 in the position shown in full lines on the drawing, and thus containers pass onward and do not enter the rails 40. As soon as the container is filled or has reached a predetermined weight, this container is released and moves by gravity on the rail 40 to a point where it is stopped by the catch bar 406. On reaching this position the switch device 45 is operated, the contact 451 of which illuminates the indicator bulb 41 to show that one filled container is waiting at this station.

The container having moved away from the filling position the contact 491 is closed and hence when the rotary switch contact reaches the contact 408 the electromagnets 886 and 18 are both operated. The latter releases the plunger 83 which allows an empty container 20 to move along the rail 80 towards the heads of the rails 40, 50, 60 and so on, and the operation of the electromagnet 886 shifts the switch rail 86 so that the support wheels of the said container are directed to the rails 40 pertaining to the station 4, on which the container moves up to the filling position where it is held by the rocker 405.

When this container is filled to a predetermined weight it is released and moves onward on the rail 40 until it comes into contact with the previously filled container, where it is stopped. At this position the contact 46 is operated closing the contact 461 which illuminates the signal lamp 42, there being now two lamps illuminated to show the operator that two filled containers are waiting ready at the station 4.

A third empty container is now directed towards the filling position as already explained, the previous operation being repeated, and the container when filled being allowed to move onward until it strikes the two previously filled containers in which position it operates the switch device 47 to close the contact 471 to illuminate the signal lamp 43. As the containers move away from the filling position towards the position where they are stopped and held ready for delivery to the rail 30, they move past a switch device 48 which closes the contact 481. This contact is in series with contacts 452 and 462 operated by the switch devices 45 and 46 respectively so that when two filled containers are waiting the third contact is adapted, by closing the switch contact 481, to operate the magnet 15 which trips the driving motor 14 for the belt 10, and thus positively indicates to the operator that no more articles should be delivered to the station 4. Alternatively the signal through the contacts 481, 452 and 462 may be used to operate a lockout device adapted to prevent operation of that key of the operator's keyboard 119 which permits or causes articles to be delivered to this station 4.

The control knobs 44, 54, 64 on the control panel 16 are available to the operator to release a loaded container from any of the stations 4, 5, 6, 7 on to the conveyance rail 30 so that the filled containers may be fed into the conveyor rail as and when necessary. It will be seen that depression of the knob 44 operates the electromagnet 441 to release the plunger 406 thereby allowing a filled container from the filling station 4 to pass over the switch rail 33 on to the conveyance rail 30, and, of course, as soon as the leading filled container leaves the stop position engaging the switch device 45 any other filled containers lying behind it are released and then stopped again at the plunger or catch bar 406 when this has returned to its normal stop position, and, of course, the indicator lights 41, 42, 43 now indicate the number of filled containers, if any, remaining at the stop position where they are held by the plunger 406.

Figure 7:
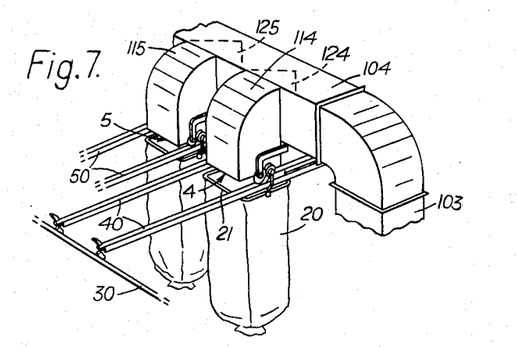
FIG. 7 illustrates a modification where each container is supported by two rails at the filling station.

In the embodiments of the invention described above the containers are supported at all times by a single rail, and at the filling point the delivery outlet from the pneumatic system is arranged to deliver articles into the containers from one side, that is between the central support rail and an adjacent parallel edge of the frame. In some cases, however, and as illustrated on FIG. 7, the containers may be supported by pairs of parallel rails 40, 50, 60 . . . at the filling stations. These parallel rails extend along each side of the frame 21, and thus the whole area above the frame is clear of obstruction and the filling of the container is thus facilitated. The filled containers 20 move downwardly by gravity on the pairs of rails 40, 50, 60 . . . and when they are released to pass towards the single feeder rail 30 the rollers 25 are deflected by the switch rails at the ends of the rails 40, 50, 60 . . . as the containers move from the parallel rails on to the single support rail. Any suitable means are provided for directing empty containers to be filled to the upper ends of the pairs of support rails 40, 50, 60 . . ..

Figure 8:
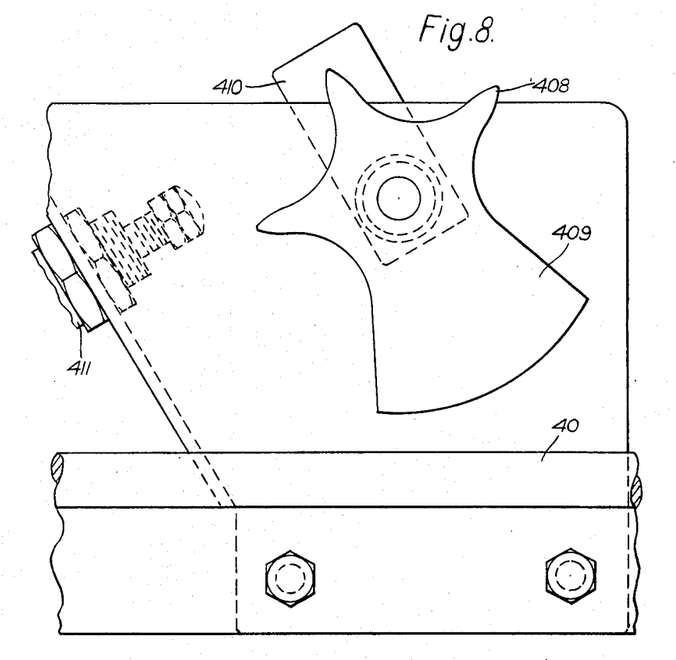
FIG. 8 illustrates a container release device.

FIG. 8 illustrates a device adapted to release a predetermined number of containers stored on the rails 40, 50, 60 for permitting them to pass onwards towards the feeder rail 30. This arrangement comprises a rotary toothed member 408 part of which includes a solid portion 409 adapted to be engaged by a roller 25 of the container and to serve as a stop to prevent further movement of said container and, of other filled containers lying behind it. An outwardly projecting arm 410 is adapted to be engaged by an air cylinder device 411 at the moment when containers are to be released on to the feeder rail 30. Operation of the air cylinder 411 against the arm 410 imparts an initial movement to the toothed member 408 so that the rollers 25 are adapted to enter the next following tooth gap, causing rotation of the toothed member 408, this movement continuing according to the number of teeth of the member 408 until the solid portion again comes to the position shown on the drawings where it acts as a stop to prevent further movement of the filled containers. Thus one, two or more containers may be released successively from the rail 40, 50, 60 . . . according to the number of teeth on the member 408. By changing the member 408 for another with a different number of teeth it is possible to modify the equipment to deliver any required number of containers on each operation of the air cylinder 411.

What we claim is:

1. Apparatus for conveying articles including at least one container adapted to travel on and to be supported from a support rail system, and in which each container comprises a rigid upper framework, an openwork container structure suspended from said framework, means closing said openwork structure at the bottom, opposed bearing sleeves fixed to said rigid framework, upwardly directed cranked rods mounted in said bearing sleeves and rotatable therein, said cranked rods including means preventing axial movement within the bearing sleeves to support the rigid framework from the support rail system and to support the openwork structure depending from the said rigid framework, and a grooved support roller mounted on the upper cranked end of each of said cranked rods, said rollers being arranged to roll on the support rail system.

2. Apparatus according to claim 1, including means for filling the containers and wherein at least one filling station is provided and containers are supported on a rail at said filling station or at each filling station during the filling of the container, and the filled container is transferred to a further support rail for conveyance of all containers from one point to another.

3. Apparatus according to claim 2, comprising a plurality of means for filling containers which are held in fixed positions by support rails and for causing selected filled containers to move on to the further support rail for conveyance from all the filling stations to a delivery point.

4. Apparatus according to claim 2, wherein a filled container is released from the filling station and moves onwards towards a storage station adapted to receive several filled containers, these containers being delivered in turn to the further support rail.

5. Apparatus according to claim 2, having means for directing an empty container to the filling station or stations where said container receives articles for conveyance by said containers.

6. Apparatus according to claim 5, comprising means for selectively delivering empty containers towards a vacant filling station.

7. Apparatus according to claim 1 wherein each roller is of V-shaped peripheral form to provide a groove which engages the support rail.

8. Apparatus according to claim 6, including continuously operated search means adapted to sense whether a container is present at each filling station and to direct an empty container to any filling station which is not provided with a container being filled.

9. Apparatus according to claim 4, wherein articles are delivered to containers at the filling stations by means of a pneumatic delivery system, said system including an operator's keyboard to control selective delivery of articles to any of a plurality of filling stations.

10. Apparatus according to claim 9, including a switch operable by a container moving into a final storage space and adapted either to stop the delivery of articles to the containers or to prevent operation of the key adapted to direct articles to that filling station pertaining to the fully occupied storage spaces.

11. Apparatus according to claim 4, including a control panel having indicator means to show the number of filled containers stored adjacent each filling station and switch means for releasing a filled container for transfer to the single support rail.

12. Apparatus according to claim 11, wherein the further support rail system is adapted to receive filled containers selectively from the stored containers at the filling stations, by operation of a catch bar at the selected station, said containers moving over pivotally mounted curved switch rail sections which deflect the support rollers for the container through 90° to enable the support rollers to be transferred simultaneously on to the further rail section, which is arranged on an incline for gravity feed and including one or more lift devices to raise the containers to a higher level to provide adequate slope for feeding the container to the desired point, or to raise the container to a higher level for discharge of the contents, the empty containers being then conveyed on a return rail towards the filling positions.

13. Apparatus according to claim 8, wherein empty containers are retained by a stop device adapted to release one container when the search means indicates that one of the filling stations is vacant, said search means being adapted to operate selective transfer means to direct that empty container to the vacant filling station.

14. Apparatus according to claim 13, wherein the transfer means comprises movable rail sections forming part of a single support rail system for empty containers, which sections are adapted to be moved to a position where the support rollers of the containers are directed towards the selected filling station.

15. Apparatus according to claim 14 comprising a plurality of switch means engageable by filled containers leaving the filling station, including a number of switches operable as the several containers reach storage positions to operate indicator means on the control panel, a further switch operated by each container leaving the filling station, said switch means being adapted to complete a stop circuit through additional contacts closed by containers already at the storage positions, said stop circuit serving to warn the operator when the storage spaces are occupied by filled containers, and a further switch engaged by a container at the filling station, said latter switch, and like switches pertaining to other filling stations, being connected to a series of fixed contacts of a continuously operating search switch adapted, when a vacant filling space is detected, to direct an empty container towards the respective filling station through the action of the transfer means.

References Cited by the Examiner
UNITED STATES PATENTS

| | | | |
|---|---|---|---|
| 743,786 | 11/1903 | White | 104—93 |
| 1,496,444 | 6/1924 | Braley | 104—250 |
| 2,035,281 | 3/1936 | Braune | 214—41 |
| 2,318,180 | 5/1943 | Morse | 104—88 |
| 3,141,705 | 7/1964 | Valentine | 302—28 |

SAMUEL F. COLEMAN, *Primary Examiner.*

ANDRES H. NIELSEN, *Examiner.*